United States Patent [19]

Doyle

[11] 4,138,132
[45] Feb. 6, 1979

[54] PROTECTIVE COVERS FOR MOTORCYCLE LOWER FORK CASES AND METHOD OF MAKING SAME

[76] Inventor: Keith H. Doyle, 10758 133rd Ave. E., Puyallup, Wash. 98371

[21] Appl. No.: 789,182

[22] Filed: Apr. 20, 1977

[51] Int. Cl.² ............................................. B62J 23/00
[52] U.S. Cl. .................... 280/289 G; 74/608; 150/52 R; 264/163; 264/271; 264/DIG. 60; 280/279; 425/275; 425/436 RM; 425/DIG. 38; 427/135; 427/154
[58] Field of Search .......... 280/289 G, 289 R, 289 H, 280/274, 275, 276, 279, 283; 264/163, 271, DIG. 60; 427/154, 133, 135; 74/608, 551.9, 551.8, 558.5; 150/52 K, 52 R; 425/DIG. 38, 275, 436 RM

[56] References Cited

U.S. PATENT DOCUMENTS

| | | | |
|---|---|---|---|
| 2,773,398 | 12/1956 | Swain | 280/289 G X |
| 3,019,287 | 1/1962 | Newcomb | 150/52 R X |
| 3,319,486 | 5/1967 | Spencer | 74/558.5 X |

FOREIGN PATENT DOCUMENTS

73077  3/1953  Netherlands ..................... 280/289 G

OTHER PUBLICATIONS

*Plastisol, Rigidsols, Vinyl Foams,* QCM Company.

*Primary Examiner*—John P. Silverstrim
*Attorney, Agent, or Firm*—David H. Deits; Roy E. Mattern, Jr.

[57] ABSTRACT

A protective cover for the bottom fork cases on the front of motorcycles is provided. The cover consists of a hollow, flexible sleeve of non-rigid plastic material which is contoured to the shape of the fork case. A longitudinal slit in the sleeve is provided to permit installation and removal of the sleeve. When made of the preferred material, plastisol, the sleeve is made by heating a form having the shape of the fork case, dipping the heated form in plastisol for a time dependent on the thickness of the coating desired, and then heat curing the coated form. The desired holes are cut in the coating with a heated gasket punch, the slit is made in the coating, and the coating is removed from the form.

9 Claims, 4 Drawing Figures

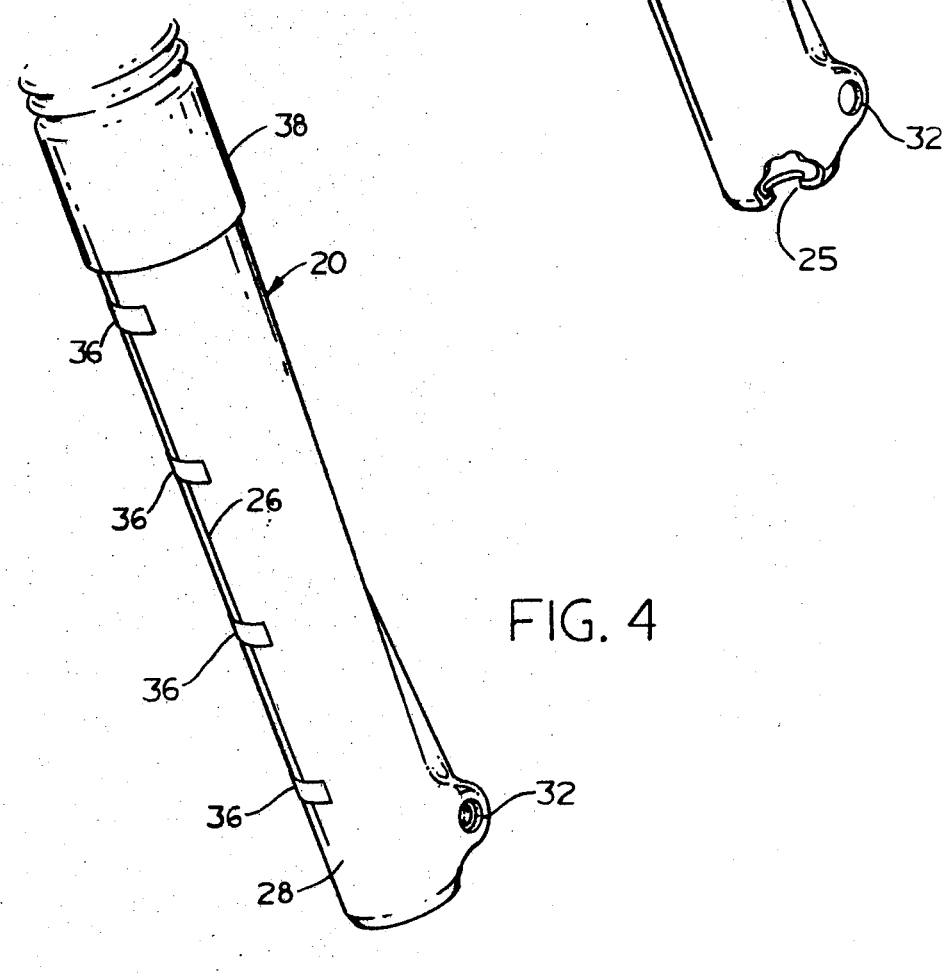

PROTECTIVE COVERS FOR MOTORCYCLE LOWER FORK CASES AND METHOD OF MAKING SAME

BACKGROUND OF THE INVENTION

Field of the Invention

The invention relates to the field of motorcycles. More particularly the invention relates to a protective cover, and its method of manufacture, for the lower portion of motorcycle front wheel suspension systems; the fork cases.

Prior Art

There have previously been attempts to provide protective covers for fork cases. Generally these covers are easily removed by thieves, and they do not provide full, effective coverage of the fork case. One such protector is a strip of flat rigid plastic with holes in its four corners. The strip is placed over the outer surface of the fork case and secured with nylon ties through the holes to the fork case. A second form of cover is a foam plastic strip with laterally projecting ears at its corners. The body of the strip is aligned with the fork case and the ears wrapped about the fork case. A nylon tie is wrapped about the fork case and ears to secure the protector in place.

SUMMARY OF THE INVENTION

A protective cover for the lower fork case of motorcycles is provided. It consists of a sleeve of a flexible plastic material, preferably plastisol, which conforms to the shape of the fork case. A longitudinal slit is provided along one side of the sleeve to facilitate installation and removal of the sleeve. Holes are provided in the sleeve to permit the attachment of the axle to the fork and to permit access to other parts such as oil drain plugs. Fasteners across the slit, such as adhesive tape, are used. To make the cover of the preferred material a form having the shape of a fork case is heated to 350° F. and dipped in plastisol until the desired thickness is achieved. The coated form is then cured at 350° F. and then cooled. The necessary holes are punched in the thus created sleeve, the sleeve is slit, and the cover removed from the form. Any excess material is trimmed and the part is ready for installation.

DESCRIPTION OF THE DRAWINGS

FIG. 3 is a perspective view of the cover with one side drawn back to more fully expose the longitudinal slit and with part of the lower end broken away to show a typical fork case access hole 25.

FIG. 4 is a perspective view of the cover in position on a lower fork case of a motorcycle illustrating the use of adhesive tape fasteners 36 and illustrating abutting contact with the dust seal 38.

DETAILED DESCRIPTION OF THE INVENTION

The Protective Cover

Figure 1:
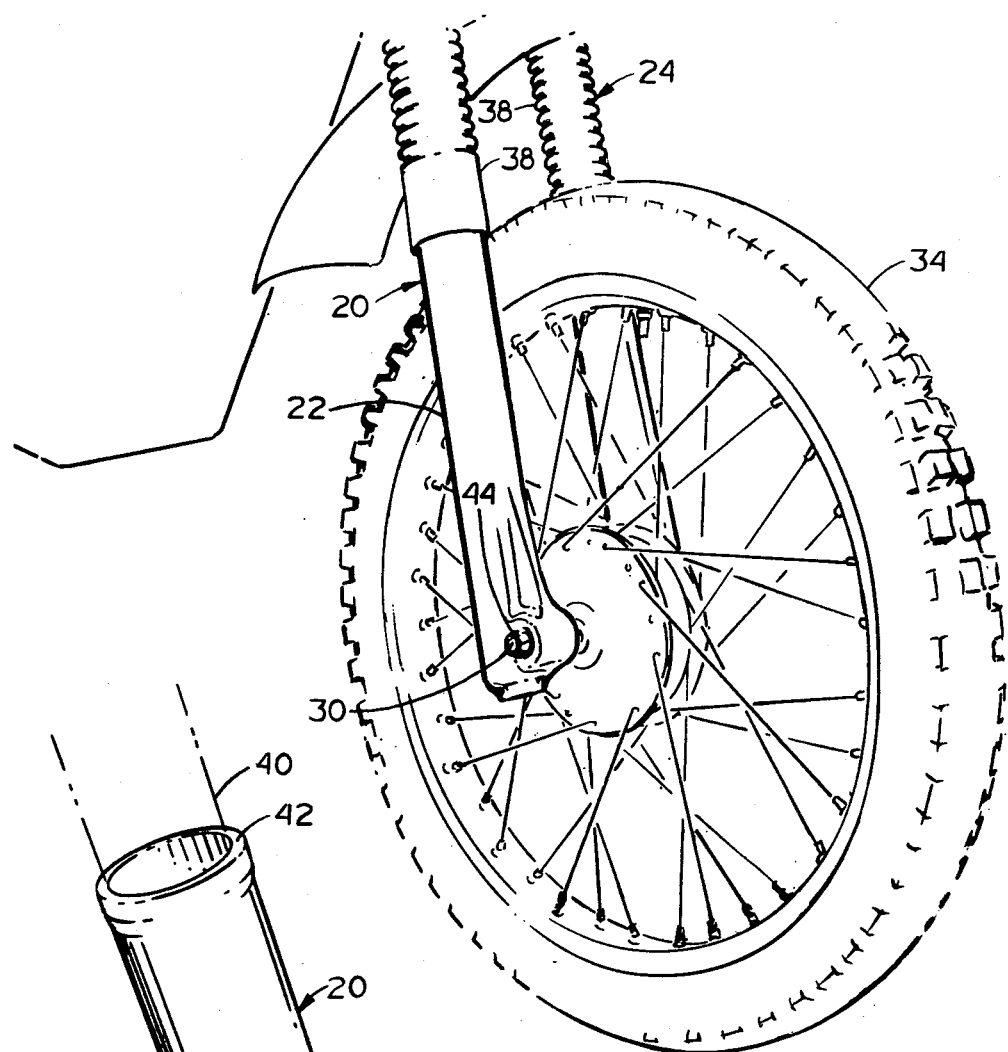
FIG. 1 is a perspective view of the front end of a motorcycle showing the covers 20 in position.

Referring to the drawings, a protective cover 20 for the bottom fork cases 22 on the front of motorcycles 24 is provided. Without the aid of a protective cover the fork cases, which are typically made of polished aluminum, are exposed to disfiguring and damaging contact from flying objects and other impacts during use of the motorcycle. The resulting chipping and pitting of the fork cases can eventually lead to failure of the fork case structurally. The protective cover consists of a flexible sleeve of polyvinyl chloride, rubber or other non-rigid plastic material which is contoured to the shape of the lower fork cases on the particular motorcycle on which it will be used. Holes 25 are provided in the protective cover to permit the through passage of bolts, axles 30, and access to other parts such as oil drain plugs. The cover 20 is provided with a longitudinal slit 26 along one surface, preferably the rear surface 28 or the inner surface adjacent the wheel. The slit runs substantially the length of the cover. Preferably the slit does not extend to the hole 32 through which the axle passes. The slit permits the easy installation of the protective covers after the front wheel 34 and other attachments to the fork cases, if any, are removed. If the slit does not extend to the axle hole, then theft of the protectors is discouraged since they must be torn off if they are to be removed quickly, destroying their value to the thief. The adjacent sections of the protective cover may be held together at the slit by lacing, adhesives, pronged clips or other fastening devices or methods. Preferably, tape 36 is used at spaced intervals across the slit. Three pieces of tape generally are sufficient. For effective coverage the protective covers should extend from the base of the fork case to its top, abutting the fork dust seal 38.

CONSTRUCTION OF THE COVER

Figure 2:
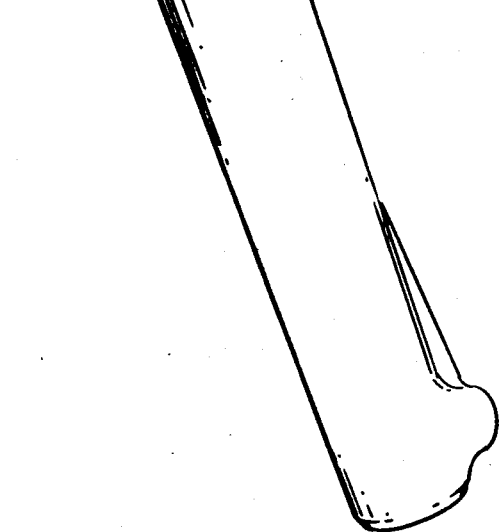
FIG. 2 is a perspective view of the cover during manufacture on its form 40 shown in phantom, as it would appear after curing with the excess material removed at the top of the cover.

The covers when constructed of the preferred material are made in the below described manner. The preferred material is a composition marketed and known generically as plastisol. All grades of the material may be used but the grade 7000 is preferred. A preferred recipe comprises a mixture of 176 pounds of phthalate plasticizer, 12 pounds of epoxy stabilizer, 7½ pounds of barium-cadmium stabilizer, 252 pounds of polyvinyl chloride resin, low molecular, and pigments to suit. The material will have a viscosity of 2000–4000 cps, a density of 10.0 pounds per gallon, and a baking temperature of 350° F. This material is coated on a pair of forms 40, shown in phantom in FIG. 2, identical in their overall shape to the fork cases on which the protective covers will be used. Fork cases are generally different in shape for different manufacturer's motorcycles. They also generally differ between a given manufacturer's models and the right fork case generally is different from the left fork case. A casting in the shape of fork cases may be used or actual fork cases may be used. If fork cases are used as forms the holes in the fork cases are closed such as by filling them with lead or welding them over. These forms are then suspended in an oven at 350° F. ± 10° F. When the forms have reached 350° F. they are dipped into the plastisol or similar material. They are held in the solution for a period of time ranging usually from one to five minutes depending on the thickness desires. A coating from 1/16 to ⅛ inch in thickness inclusive is preferred. After the desired thickness has been achieved the coated forms are withdrawn from the solution and placed in the oven at 350° F. for curing. The curing time is approximately 20 to 25 minutes. The material changes from a dull finish to a high luster at the end of the curing process. After the curing the coated forms are withdrawn from the oven and cooled. They may be air cooled by exposure to circulating air, as is preferred or cooled by submersion in water. After cooling to a point that they can be easily handled with bare hands the desired holes may be cut in the coating. Preferably this is done by using a heated gasket punch of the desired size. Hand pressure on the punch is sufficient to cut the holes. The covers are cut to length with a circumscribing cut as at 42 in FIG. 2, using a sharp knife and the longitudinal slit 26 is made down one side. The covers are removed from the form by peeling them off of the forms, turning them inside out. Any excess material is trimmed off and the skins are turned right side out ready for installation.

INSTALLATION

To install the protective covers the cotter pin (not shown) and the castle nut 44 are removed from the front wheel. This permits removal of the axle and front wheel assembly from the front fork cases. The covers are then pushed on the fork cases until they fit snugly in all areas. The cases are rotated to expose the slit and the desired fasteners are applied. When plastisol is used a vinyl tape is preferred. The cases are then rotated back into their proper position and the front wheel assembly is remounted.

The result is protective covers which provide 360 degree protection. They don't chip, and they provide a good appearance improving the appearance of existing pitted and scarred cases. They may be constructed in a wide variety of colors and no design changes are required in the motorcycle. The covers may be removed if and when desired.

I claim:

1. A removable protective cover for fork cases on motorcycles to prevent damage to the cases and provide an attractive appearance, comprising, a hollow flexible tubular sleeve of a non-rigid material having an open top end and a bottom end and being matingly contoured to the shape of the lower fork case for coextensive face to face contact therewith and means defining a slit through its surface to permit installation and removal of the sleeve, said slit extending longitudinally along the sleeve for substantially its full length but terminaing short of said bottom end to thus form essentially an elongate, one-piece tube split along its length, with an integral collar at said bottom end below the termination of the slit whereby after installation on a motorcycle fork case a cover protecting the fork case and its lower terminal end is provided which is not easily removed, to thereby assure its retention on the fork and discourage theft.

2. A removable protective cover for fork cases on motorcycles to prevent damage to the cases and provide an attractive appearance, as claimed in claim 1 wherein the sleeve is made of plastisol.

3. A removable protective cover for fork cases on motorcycles to prevent damage to the cases and provide an attractive appearance, as claimed in claim 2 wherein the sleeve has a thickness within the range of 1/16 inch to ⅛ inch inclusive.

4. A removable protective cover for fork cases on motorcycles to prevent damage to the cases and provide an attractive appearance, as claimed in claim 1, comprising in addition means for fastening the sections of the sleeve adjacent the slit together to secure the cover on the fork case.

5. A removable protective cover for fork cases on motorcycles to prevent damage to the cases and provide an attractive appearance, as claimed in claim 4, wherein the fastening means comprises adhesive tape.

6. A method of making a protective cover in the form of a tube having an open top and a bottom end for fork cases for motorcycles, comprising the steps of:
   (a) heating a form having a shape like the fork case on which the cover is to be used to 350° F.;
   (b) dipping the heated form in plastisol until the desired thickness of coating on the form is achieved;
   (c) curing the coated form by heating at 350° F. until the surface develops a high luster;
   (d) slitting the coating along one side but terminating said slit short of the bottom end of the tube to thus form a one-piece longitudinally split tube with an integral collar at the bottom end of the tube; and
   (e) removing the coating from the form.

7. A method of making protective covers for fork cases for motorcycles, as claimed in claim 6, comprising the additional step of punching holes in the cured coating with a heated gasket punch prior to its removal from the form.

8. Very closely fitting full covers for fork cases of motorcycles, each cover being snugly applied from the bottom of each fork and moved upwardly into place, to thereafter protect the fork case from any possible damage to be otherwise caused by flying debris, while also creating an attractive appearance, each comprising a hollow flexible molded tubular sleeve of plastisol, comprising phthalate plasticizer, epoxy stabilizer, barium cadmium stabilizer, polyvinyl chloride resin, low molecular, and pigments to suit, the resulting material having a viscosity in the range of 2000 to 4000 c.p.s., a density of 10 pounds per gallon, and a baking temperature of 350° F., the sleeve having a central opening at the top to accommodate the fork case adjacent the bottom of a dust seal previously applied to a fork case, a central opening at the bottom, smaller than the central top opening, to accommodate the fork case at its bottom, means defining oppositely spaced holes in the sleeve, transversely positioned above the central opening at the bottom, to accommodate an axle of a front wheel of a motorcycle, means defining additionally transversely arranged holes, as necessary, to provide access for other members protruding from the fork case, and a slit commencing at the top of the hollow flexible molded sleeve and extending downwardly to a length necessary to aid in its installation, but terminating above the bottom of the sleeve to thus form essentially an elongate one-piece tube split along its length and an integral collar at the bottom end below the termination of the slit thereby insuring the flexible molded sleeve will always remain essentially in its installed position following the securement of the front wheel axle, and thereby also discouraging theft of the sleeve.

9. A method of making very closely fitting full covers for fork cases of motorcycles, each cover being snugly applied from the bottom of each fork and moved upwardly into place, comprising the steps of:
   (a) heating a form having the shape of a fork case of a motorcycle, from a top location adjacent a fork case dust seal to a complete bottom of a fork case, to a uniform temperature of about 350° F.;
   (b) heating to about 350° F., a quantity of plastisol, comprising phthalate plasticizer, epoxy stabilizer, barium cadmium stabilizer, polyvinyl chloride resin, low molecular, and pigments to suit, the resulting material before heating having a viscosity in the range of 2000 to 4000 c.p.s. and a density of 10 pounds per gallon;

(c) dipping the heated form into the tank of heated plastic material until a coating of this heated plastic material, then adhering on the heated form, is in the range of 1/16 to ⅛ of an inch in thickness;

(d) removing the heated form with its plastic material coating from the heated tank;

(e) heating, as soon as possible after removal from the tank, the form and its plastic material in an oven at 350° F., for a curing time of 20 to 25 minutes;

(f) removing the heated form and its cured plastic material cover from the oven;

(g) cooling the heated form and its cured plastic material cover down to a hand handling temperature;

(h) forming selected openings in the plastic material using respective heated punches of sizes to match parts protruding from a fork case or passing through a fork case, such as a transverse axle of a front wheel of a motorcycle;

(i) slitting the plastic material cover longitudinally from its top down to a location short of its other end to thus form essentially an elongate one-piece tube split along its length with an integral collar below the termination of the slit thereby insuring the plastic material cover when later installed on a fork case of a motorcycle, will always remain essentially in its installed position following the securement of the front wheel axle, and thereby also discouraging its theft;

(j) removing the formed plastic material cover from the form; and (k) trimming any excess material from the formed plastic material cover.

* * * * *